(12) United States Patent
Schulze et al.

(10) Patent No.: US 7,142,608 B2
(45) Date of Patent: Nov. 28, 2006

(54) METHOD FOR THE TRANSMISSION OF DIGITAL DATA BY MEANS OF RADIO SIGNALS WITH ORTHOGONAL FREQUENCY DIVISION MULTIPLEXING (OFDM)

(75) Inventors: Henrik Schulze, Maschede (DE); Frank Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 10/332,299

(22) PCT Filed: Jun. 26, 2001

(86) PCT No.: PCT/DE01/02354

§ 371 (c)(1),
(2), (4) Date: Apr. 2, 2003

(87) PCT Pub. No.: WO02/03640

PCT Pub. Date: Jan. 10, 2002

(65) Prior Publication Data

US 2003/0152020 A1 Aug. 14, 2003

(30) Foreign Application Priority Data

Jul. 4, 2000 (DE) .............................. 100 31 803

(51) Int. Cl.
*H04K 1/10* (2006.01)
*H04L 27/28* (2006.01)

(52) U.S. Cl. ..................................... 375/260; 714/752

(58) Field of Classification Search ................ 375/260, 375/261, 279, 229, 231, 232, 362; 714/752, 714/755

See application file for complete search history.

(56) References Cited

U.S. PATENT DOCUMENTS 5,134,464 A 7/1992 Basile et al.
5,822,372 A 10/1998 Emami
RE36,430 E 12/1999 Halbert-Lassalle et al.
6,061,405 A * 5/2000 Emami ........................ 375/260
6,405,338 B1 * 6/2002 Sinha et al. ................ 714/752

FOREIGN PATENT DOCUMENTS

DE 691 10 716 T 2 2/1996
DE 196 09 909 9/1997

(Continued)

OTHER PUBLICATIONS

Lauterbach, Thomas, "DAB/DMB: der neue digitale terrestrische Multimedia Rundfunk", telecom praxis May 1997, pp. 34-41; English language abstract of article is attached.

(Continued)

*Primary Examiner*—Phuong Phu
(74) *Attorney, Agent, or Firm*—Kenyon & Kenyon LLP

(57) ABSTRACT

A method of transmitting digital data by radio signals in orthogonal frequency division multiplex (OFDM). Digital data is divided into error protection classes and the power level of the digital data is altered according to the particular error protection class. In addition to the data thus altered, error protection class data is transmitted in a separate logic channel. By using this error protection class data, a reception device is able to reverse this change in power level and perform a correct demodulation. The error protection class data is generated on the basis of the number, length and transmission reliability of the error protection classes and on the basis of transmission parameters. The digital data, divided into frames, is first assigned to services, and then these services are assigned to a corresponding error protection class.

13 Claims, 1 Drawing Sheet

FOREIGN PATENT DOCUMENTS

DE    693 24 906 T 2    12/1999

OTHER PUBLICATIONS

Schulze, Henrik, "Digitale Audio Broadcasting (DAB)—Stand der Entwicklung," Bosch Technische Berichte, 1991, heft 54, pp. 17-25; English language summary of article is on p. 25.

Ratliff, Paul, "Eureka 147 Digital Audio Broadcasting—The System for Mobile, Portable and Fixed Receivers" Second International Symposium on Digital Audio Broadcasting, Toronto Mar. 14-17, 1994, pp. 294-304.

Wachter, Thomas, "Ubertragungsverfahren des zukunftigen Digitalen Horrundfunks", Mitteilungen aus dern Forschungszentrum der tlekom, 46, Jahrgang, Nov./Dec. 1992, pp. 1-43; English language summary of article on p. 40.

* cited by examiner

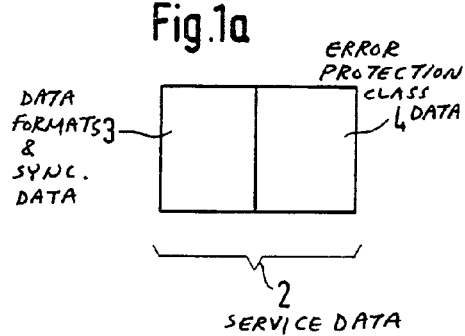
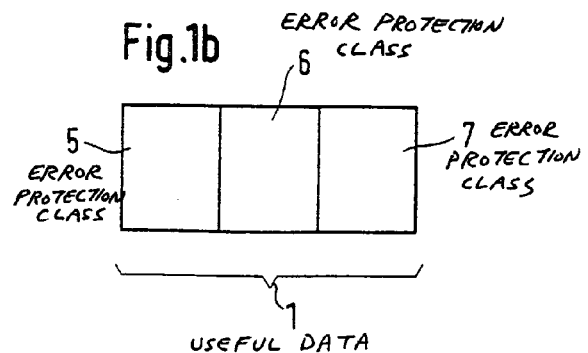
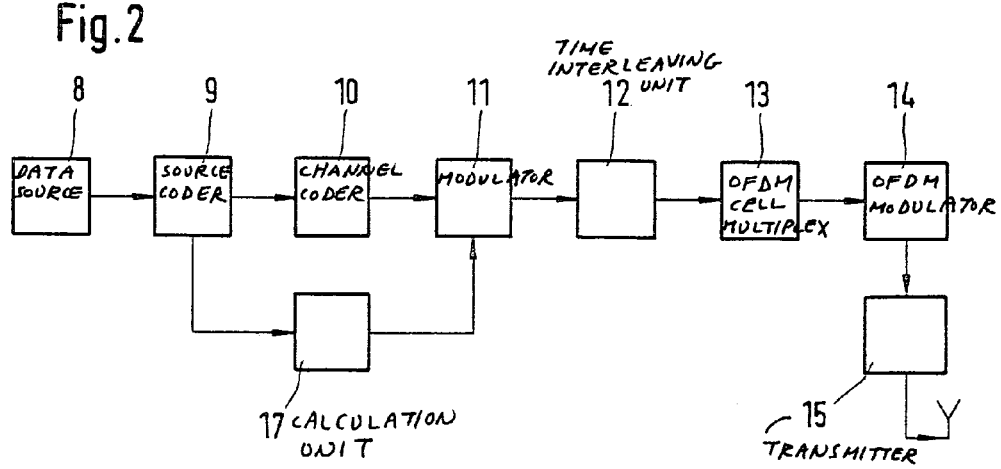
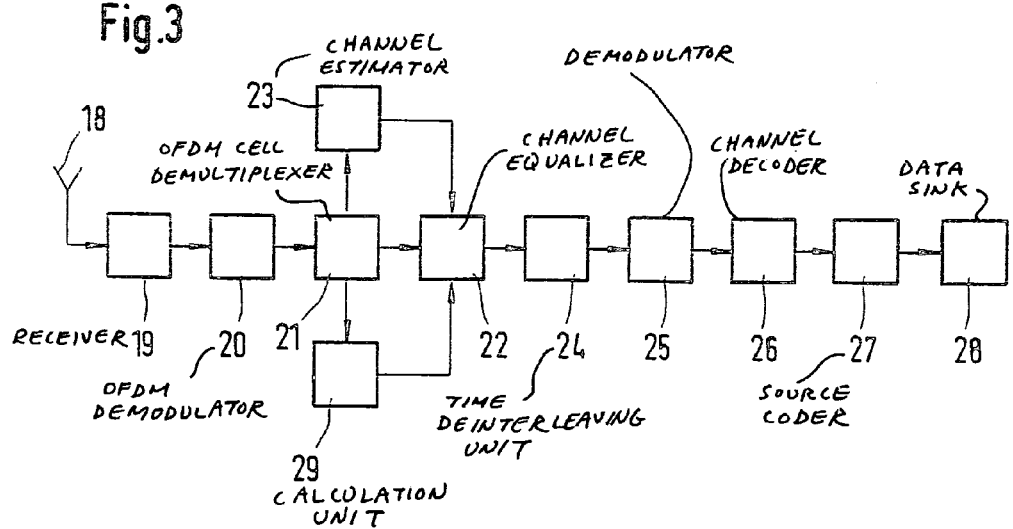

METHOD FOR THE TRANSMISSION OF DIGITAL DATA BY MEANS OF RADIO SIGNALS WITH ORTHOGONAL FREQUENCY DIVISION MULTIPLEXING (OFDM)

FIELD OF THE INVENTION

The present invention is directed to a method of transmitting digital data by radio signals in orthogonal frequency division multiplex (OFDM).

BACKGROUND INFORMATION

Digital radio systems such as DAB (digital audio broadcasting) and DRM (Digital Radio Mondiale) have been developed and used. DRM is intended in particular for the transmission frequency range below 30 MHz. With such digital radio transmissions, errors occur in the received radio signals due to channel properties and noise. By channel coding, redundancy is added to the useful data to be transmitted, such errors may be corrected in a receiving device. However, it is not always possible to correct all the errors. In the case of audio data in particular, but also other data, the data to be transmitted is divided into frames. The individual bits of data to be transmitted have different immunities to interference. Therefore, the goal is different error rates and a more heterogeneous error protection.

SUMMARY OF THE INVENTION

The exemplary method according to the present invention for transmitting digital data by radio signals in orthogonal frequency division multiplex (OFDM) may provide that a different bit error rate for different digital data is achieved by transmitting digital data belonging to different error protection classes at different transmission power levels. This has a direct effect on the signal-to-noise ratio and thus on the error rate, because the error rate is lower as this ratio becomes better. Any desired division of the error protection classes may be used and even the power levels may be used. The ratio of the length of the error protection classes may also be selected at will here. This method is efficient with regard to transmission power.

Different services and thus the data allocated to these different services may achieve different bit error rates in the receiver, thus permitting a differentiation with regard to the service from the standpoint of the acceptable bit error rate, and this ensures efficient utilization of the available transmission bandwidth for the transmission of useful data. In addition, in the case of the digital data of a service, the data may be divided into groups, the division being based on the significance of the individual data. Then an error protection class is assigned to each of these groups. For example, in the case of an MPEG audio frame, the page information (scale factors, checksums, frame header, etc.) is considered to be more susceptible to errors than is the main information (audio data) because errors in the page information have much more serious effects than do errors in the main information. Therefore, with the exemplary method according to the present invention, the page information and the main information are each considered as a group, and the page information is assigned to an error protection class which offers better protection against errors than that used for the main information.

The error protection class data may be calculated by using different parameters of the error protection classes and by using transmission parameters. The transmission parameters include the code rate, the step of modulation and the number of OFDM (orthogonal frequency division multiplex) carriers. The error protection class data is also referred to as cell performance parameters.

In addition, the digital data may be transmitted by an angle modulation such as QPSK (quadrature phase shift keying) or QAM (quadrature amplitude modulation) which offer a high transmission rate and an adequate interference immunity.

In addition, the modulation of the digital data, i.e., with angle modulation, may be performed as a function of the particular error protection class. The amplitude in modulation of the signal is varied according to the power which is determined by the error protection class. This is done, for example, by a factor by which the amplitude is multiplied. The error protection class-dependent power may be introduced in forming the OFDM cell multiplex. Then the particular cell is multiplied by a factor according to the error protection class to be taken into account in order to have the corresponding power level.

In addition, the data to be transmitted may be resorted with regard to time and sorted again at the reception end. This is referred to as time interleaving or deinterleaving. It prevents interference which is of a short duration in time from having a fatal effect on the data to be transmitted, because data belonging together in time is artificially separated here in time for the transmission.

Reference pilots may be added to the OFDM cell multiplex to perform a channel estimate at the reception end and thus perform equalization of the received data.

The digital data may be assigned to services and that there is a particular error protection class for a particular service. Thus the particular services are expected at a particular bit error rate at the reception end.

A transmitter and/or a receiving device may be provided for implementing the exemplary method according to the present invention, the transmitter and receiving device each including a calculation unit which calculates the error protection class data at the transmission end and calculates this effect on the received data from the error protection class data at the reception end in order to take this into account in demodulation.

BRIEF DESCRIPTION OF THE DRAWINGS

FIG. 1 shows a division of the digital data to be transmitted into two frames.

FIG. 2 shows a block diagram of a transmitter.

FIG. 3 shows a block diagram of a receiver.

DETAILED DESCRIPTION

Various services require different bit error rates, such as strictly data transmission, audio data transmission or video data transmission, which are performed via digital radio transmission systems.

Therefore, according to the present invention, an exemplary method of transmitting digital data by radio signals in orthogonal frequency division multiplex (OFDM) is used, the digital data being divided into error protection classes, and then the digital data of the particular error protection class being transmitted at a different power, so that it is received at a bit error rate corresponding to the error protection class. Error protection class data, which may allow for the receiving device to take into account the different powers on the basis of the error protection class in demodulation, are sent in a separate logic channel. This error protection class data is demodulated, i.e., analyzed, before the useful data. Digital data transmissions are transmitted with angle modulation QPSK or QAM. Modulation or formation of the OFDM cell multiplex is performed as a function of the particular error protection class. The error protection class determines a change in the power level of the digital data in modulation or a change in the OFDM cells. The digital data is assigned to services, these services including different error protection classes. Digital data belonging to a service is also divisible into groups, each group being assigned a corresponding error protection class.

Data is transmitted in orthogonal frequency division multiplex here. Orthogonal frequency division multiplex means that data to be transmitted is distributed on OFDM subcarriers in close proximity at different frequencies. An OFDM cell is a datum having the length of one OFDM symbol, which is on an OFDM subcarrier. Thus, if there are K carriers, then there are K OFDM cells. All K OFDM cells together form one OFDM symbol. Distribution among different frequencies is an effective measure in radio transmissions to counteract a frequency-selective attenuation (fading). By resorting with respect to time, i.e., time interleaving, a time-selective interference signal will not have a drastic effect on the digital data received.

FIGS. 1a and 1b show the division of the digital data to be transmitted into two frames. The frame in FIG. 1a is provided for service data 2, while the frame in FIG. 1b is used for the useful data. The frames are in time multiplex and represent different logic channels.

Useful data 1 is divided into error protection classes 5, 6 and 7. Error protection classes 5, 6 and 7 here are of different lengths. Three error protection classes are shown as examples here, a division into more or fewer error protection classes may also occur. The error protection classes may be of any length, and there may be any desired ratio of lengths to one another. These include the useful data for a service, an audio program, so the useful data is divided into groups here, each group being assigned to one error protection class. Error protection class 5 pertains to the page information, which indicates to a decoder how audio data is to be decoded. Therefore, the page information is more sensitive to errors than is the actual audio data, and error protection class 5 therefore imparts a higher power and thus a lower bit error rate to the page information. Error protection class 6 pertains to audio data, error protection class 7 is radio text, and error protection class 6 provides a higher error protection than error protection class 7.

Service data 2 is divided into a part 3 for data formats and synchronization data and a part 4 for error protection class data. Dividing this into two frames means that error protection class data 4 is transmitted in a different logic channel, which is separate from the useful data. The error protection class data is not itself affected by an error protection class. In the case of DAB, for example, error protection class data would be transmitted in the FIC (fast information channel), FIC being separate from the useful data to be transmitted and thus constituting a separate logic channel. In the case of DRM, the error protection class data is transmitted in SDC (service description channel), for example. The digital data to be transmitted may be divided into more than two frames.

FIG. 2 shows a block diagram of a transmitter which uses the exemplary method according to the present invention for transmission of digital data by radio signals in orthogonal frequency division multiplex (OFDM). A data source 8 outputs data to a source coding 9. A first data output of source coding 9 leads to a channel coding 10. A second data output of source coding 9 leads to a calculation unit 17. A data output of channel coding 10 leads to a first data input of a modulator 11. Data from calculation unit 17 is applied to a second input of modulator 11. Modulator 11 is connected at its data output to a time resorting (time interleaving) unit 12. An OFDM cell multiplex 13 is connected to time interleaving 12. OFDM cell multiplex then goes to an OFDM modulator 14, which relays its signals to a transmitting device 15. Transmitting device 15 uses antenna 16 for sending the radio signals.

Source coding 9 performs source coding, namely according to MPEG 2 or MPEG 4 here as an example, on the data coming from data source 8. Data source 8 here is, for example, an audio playback device such as a CD-ROM drive, a mini disc drive or a hard drive with audio data files. The data volume is reduced by source coding 9 by removing irrelevancy from the data. The source-coded data is transmitted from source coding 9 to channel coding 10. In addition, the source-coded data is divided in source coding 9 into frames and the digital data in the frames is assigned to error protection classes. Three error protection classes 5, 6 and 7 are used here as shown in FIG. 1. Error protection classes 5, 6 and 7 here correspond to services to which the particular data belongs. These services here include an audio program, a video data stream and a data file transmission for Internet use or just an audio program. The data regarding the length of the error protection class, the number of error protection classes and the transmission reliability defined of the individual error protection classes is sent as input data to calculation unit 17.

Channel coding 10 performs channel coding on the source-coded digital data by adding redundancy to the digital data by manner of which a receiving device may recognize faulty signals and correct them if necessary. However, this error correction may occur only up to a certain number of errors. If the number of errors is greater than this, error correction is no longer performed. The channel-coded digital data is modulated with an angle modulation, namely QAM (quadrature amplitude modulation) here, in modulator 11. In this process, the digital data is assigned to a fixed amplitude and phase, i.e., a complex amplitude. The absolute value of the digital data is altered according to the error protection class, i.e., the amplitude is multiplied by a factor. Error-sensitive data is increased with respect to amplitude, i.e., an increase in power, and error-insensitive data is increased to a lesser extent. A reduction in power with respect to the original modulation amplitude may also occur. This modulation results in modulation symbols, referred to below as OFDM cells. Calculation unit 17 has calculated the power level for the individual modulation symbols as a function of the particular error protection class.

Then the OFDM cells are resorted by time sorting unit 12 using time interleaving. Then the OFDM cell multiplex is formed in OFDM cell multiplex 13 by adding reference pilots in addition to the OFDM cells, so that a channel estimate may occur on the reception end. This channel estimate, which results in equalization, may occur only with coherent transmission systems. In the case of incoherent transmission systems, no channel estimate or equalization is performed. Then no reference pilots are necessary. The OFDM cell multiplex is then distributed among the individual carriers in OFDM modulator 14. Each cell arrives at a different carrier and thus at a different frequency. Then the signals to be transmitted are amplified in transmitting device 15 and then sent via antenna 16.

As an alternative, the data output of calculation unit 17 is connected not to modulator 11 but instead to OFDM cell multiplex 13, in which case a particular cell is altered with regard to power with respect to the assigned error protection class in OFDM cell multiplex 13. Then error protection classes 5, 6 and 7 includes integral multiples of OFDM cells. The error protection data calculated by calculation unit 17 is added to service data 2, as shown in FIG. 1, in the OFDM cell multiplex.

FIG. 3 shows a receiving device as a block diagram. An antenna 18 is connected at its output to a reception part 19. A data output of reception part 19 leads to an OFDM demodulator 20. The data output of OFDM demodulator 20 leads to a data input of an OFDM cell demultiplexer 21. A first data output of OFDM cell demultiplexer leads to a first data input of a channel equalizer 22. A second data output of OFDM cell demultiplexer 21 leads to a data input of a channel estimator 23. Channel estimator 23 is connected to a second data input of channel equalizer 22. A calculation unit 29 is connected to a third data input of channel estimator 23. A data output of channel equalizer 22 is connected to a time sorting 24 (deinterleaving). The data output of time sorting 24 leads to a demodulator 25, which is in turn connected to a channel decoding 26. The output data from channel decoding 26 leads to a data input of source coding 27. Source coding 27 is in turn connected to a data input of a data sink 28.

Radio signals received by antenna 18 are filtered by sending part 19, amplified, converted to an intermediate frequency and digitized. This digital data is then converted to a data stream by the OFDM demodulator. The resulting data stream then goes to the OFDM cell multiplex, the reference pilots being removed from the OFDM cell multiplex, so that channel estimator 23 performs the channel estimation by which equalizer 22 equalizes the received data. Calculation unit 29 calculates from the error class data derived from the OFDM cell multiplex the corresponding power levels with which the transmitted data is evaluated according to the present invention, so that channel equalizer 22 takes this into account in the equalization. The data thus equalized and corrected for the power, which depends on the error protection class, is then returned to the correct chronological sequence by time interleaving, so that demodulator 25 is then able to determine the digital data again from the demodulated data. The demodulated data is then subjected by channel decoding 26 to channel decoding, i.e., redundancy is used to determine the bit error and for error correction, if necessary. Data thus corrected is then sent from source decoding unit 27 to source decoding, irrelevancy being added back to the received data according to predetermined rules. Data received from source decoding 27 is then processed further by data sink 28, which is, for example, a multimedia bus connected to an audio playback, to play back audio data contained in the digital data. A display which displays the transmitted data may also function as a data sink.

As an alternative, calculation unit 23 may be connected at its output to demodulator 25, so that the power level here, which has been altered according to the error protection class of the particular data here, may be reversed to correctly demodulate the data. If this were not done, demodulated data would have a different amplitude due to the power level, which depends on the error protection, than would be the case on the basis of the information to be transmitted and thus the modulation. The wrong data would thus be demodulated. Therefore, the consideration of error class-dependent power is used before demodulation.

What is claimed is:

1. A method of transmitting digital data by radio signals in orthogonal frequency division multiplex, the method comprising:
    dividing the digital data into frames at an transmission end, the digital data in the frames being divided into error protection classes;
    modulating the digital data to OFDM cells, the OFDM cells being converted in an OFDM cell multiplex, and each of the OFDM cells being assigned to an OFDM subcarrier;
    transmitting the OFDM cells at a power level corresponding to one of the error protection classes;
    transmitting error protection class data in a logic channel separate from the digital data; and
    demodulating the OFDM cells to digital data at a reception end as a function of the error protection class data;
    wherein the error protection class data is generated by using a number, length and transmission reliability of the error protection classes and by using transmission parameters.

2. The method of claim 1, wherein the digital data in the frames is assigned to at least one service, and one of the error protection classes is assigned to the at least one service.

3. The method of claim 2, wherein the digital data assigned to the at least one service is divided into groups, and one of the error protection classes is assigned to each of the groups.

4. The method of claim 1, wherein the OFDM cells are modulated with an angle modulation.

5. The method of claim 4, wherein one of a quadrature amplitude modulation and a quadrature phase shift keying is used as the angle modulation.

6. The method of claim 4, wherein modulation is performed as a function of one of the error protection classes.

7. The method of claim 4, wherein the OFDM cells are altered with regard to a power level as a function of one of the error protection classes in the OFDM cell multiplex.

8. The method of claim 1, wherein the OFDM cells are re-sorted with regard to time at the transmission end and are sorted before demodulation at the reception end.

9. A method of transmitting digital data by radio signals in orthogonal frequency division multiplex, the method comprising:
    dividing the digital data into frames at an transmission end, the digital data in the frames being divided into error protection classes;
    modulating the digital data to OFDM cells, the OFDM cells being converted in an OFDM cell multiplex, and each of the OFDM cells being assigned to an OFDM subcarrier;
    transmitting the OFDM cells at a power level corresponding to one of the error protection classes;
    transmitting error protection class data in a logic channel separate from the digital data; and
    demodulating the OFDM cells to digital data at a reception end as a function of the error protection class data;
    wherein the digital data is re-sorted with regard to time at the transmission end and is sorted after demodulation at the reception end;
    wherein reference pilots are added to the OFDM cell multiplex at the transmission end, and a channel estimate and synchronization are performed by using the reference pilots at the reception end.

10. The method of claim 8, wherein reference pilots are added to the OFDM cell multiplex at the transmission end, and a channel estimate and synchronization are performed by using the reference pilots at the reception end.

11. The method of claim 9, wherein the radio signals received are equalized by using the channel estimate, and by considering the error protection class data.

12. The method of claim 10, wherein the radio signals received are equalized by using the channel estimate, and by considering the error protection class data.

13. A transmitter comprising:
a source coder arrangement;
a channel coder arrangement connected downstream to the source coder arrangement;
a modulator connected downstream to the channel coder arrangement;
a time interleaver connected downstream to the modulator;
an OFDM cell multiplexer connected downstream to the time interleaver;
an OFDM modulator connected downstream to the OFDM cell multiplexer; and
a calculation arrangement to calculate error protection class data, wherein an input of the calculation arrangement is connected downstream to the source coder arrangement, and wherein an output of the calculation arrangement is connected upstream to the modulator;

wherein the transmitter is operable to transmit digital data by radio signals in orthogonal frequency division multiplex by performing the following:
dividing the digital data into frames at a transmission end, the digital data in the frames being divided into error protection classes;
modulating the digital data to OFDM cells, the OFDM cells being converted in an OFDM cell multiplex, and each of the OFDM cells being assigned to an OFDM subcarrier;
transmitting the OFDM cells at a power level corresponding to one of the error protection classes;
transmitting the error protection class data in a logic channel separate from the digital data; and
demodulating the OFDM cells to digital data at a reception end as a function of the error protection class data;
wherein the error protection class data is generated by using a number, length and transmission reliability of the error protection classes and by using transmission parameters.

* * * * *